United States Patent
Madsen

(10) Patent No.: US 8,056,203 B2
(45) Date of Patent: Nov. 15, 2011

(54) SYSTEM FOR TRANSPORTATION OF BLADES ON RAILCARS

(75) Inventor: Jonas Madsen, Tjæreborg (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/059,291

(22) PCT Filed: Dec. 23, 2008

(86) PCT No.: PCT/EP2008/068216
§ 371 (c)(1),
(2), (4) Date: Feb. 16, 2011

(87) PCT Pub. No.: WO2010/020297
PCT Pub. Date: Feb. 25, 2010

(65) Prior Publication Data
US 2011/0131785 A1    Jun. 9, 2011

Related U.S. Application Data

(60) Provisional application No. 61/089,621, filed on Aug. 18, 2008.

(51) Int. Cl.
*B23Q 3/00* (2006.01)
*B23P 19/00* (2006.01)
(52) U.S. Cl. ...................... 29/407.09; 29/759
(58) Field of Classification Search ............... 29/407.09, 29/404, 428, 434, 464, 468, 559, 700, 721, 29/759, 760, 281.4; 410/44–47, 77, 101; 105/355, 199.1, 238, 393, 396, 407
See application file for complete search history.

(56) References Cited

U.S. PATENT DOCUMENTS

| 3,911,830 | A | 10/1975 | Adams |
| 6,286,435 | B1 * | 9/2001 | Kassab et al. ............... 105/171 |
| 7,204,665 | B2 * | 4/2007 | Heuvel et al. ............... 410/44 |
| 7,326,013 | B2 * | 2/2008 | Heuvel et al. ............... 410/44 |
| 7,690,875 | B2 * | 4/2010 | Grabau ............... 410/45 |
| 2006/0285937 | A1 | 12/2006 | Wobben |
| 2007/0189895 | A1 | 8/2007 | Kootstra et al. |

FOREIGN PATENT DOCUMENTS

| JP | 2002059776 A | 2/2002 |
| WO | WO 2006/000230 A1 | 1/2006 |
| WO | WO 2008/104185 A1 | 9/2008 |

* cited by examiner

*Primary Examiner* — John C Hong

(57) ABSTRACT

A fixation system for fixing wind turbine elements of a wind turbine to a vehicle is provided. The fixation system includes a first fixation device for fixing a first portion of a wind turbine element pivotably around a first axis of the first fixation device and around a second axis of the first fixation device to the vehicle. A second fixation device fixes a second portion of the wind turbine element pivotably around a first axis of the second fixation device and around a second axis of the second fixation device. One of the first fixation device and of the second fixation device is adapted for providing a translation movement of the wind turbine element with respect to the vehicle along a third axis. The first axis, the second axis and the third axis are different.

17 Claims, 10 Drawing Sheets

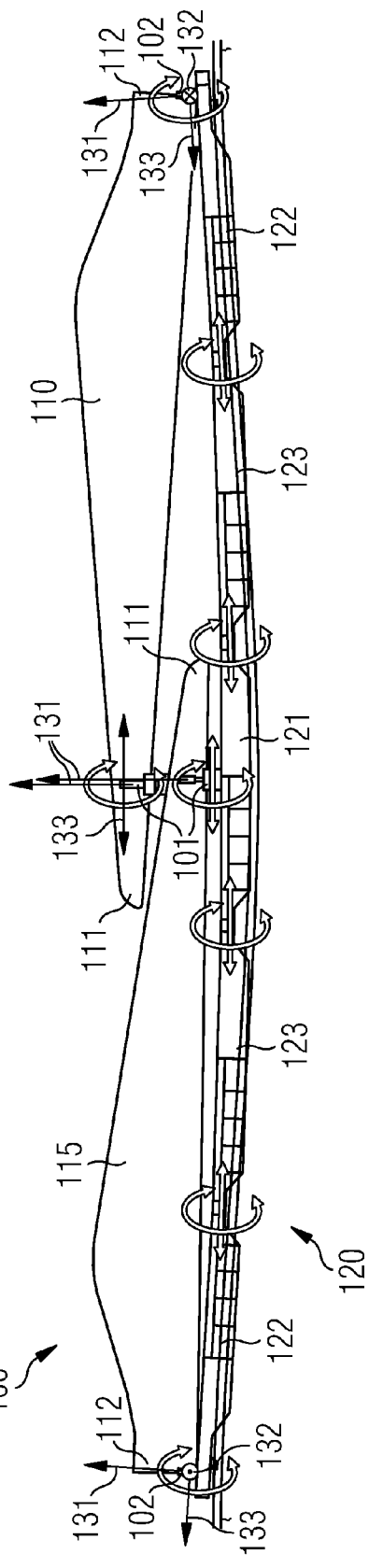
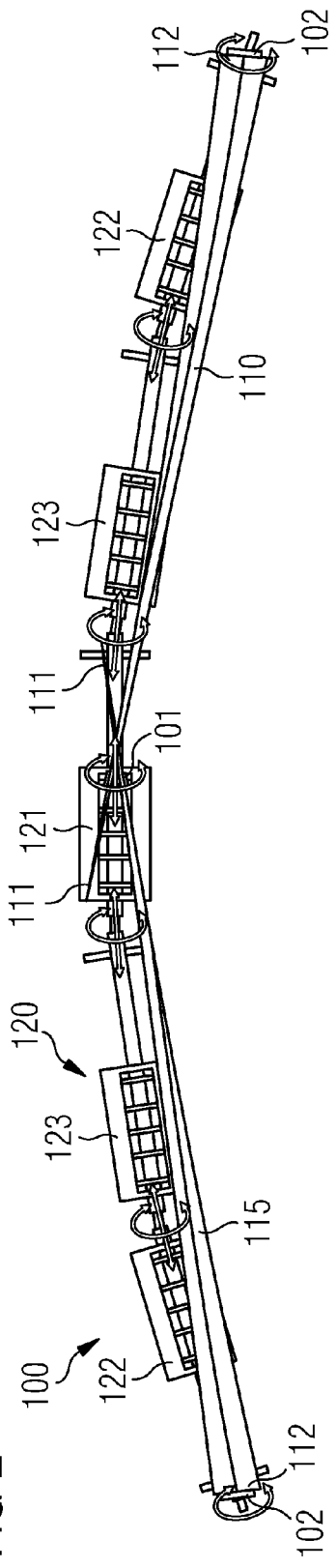

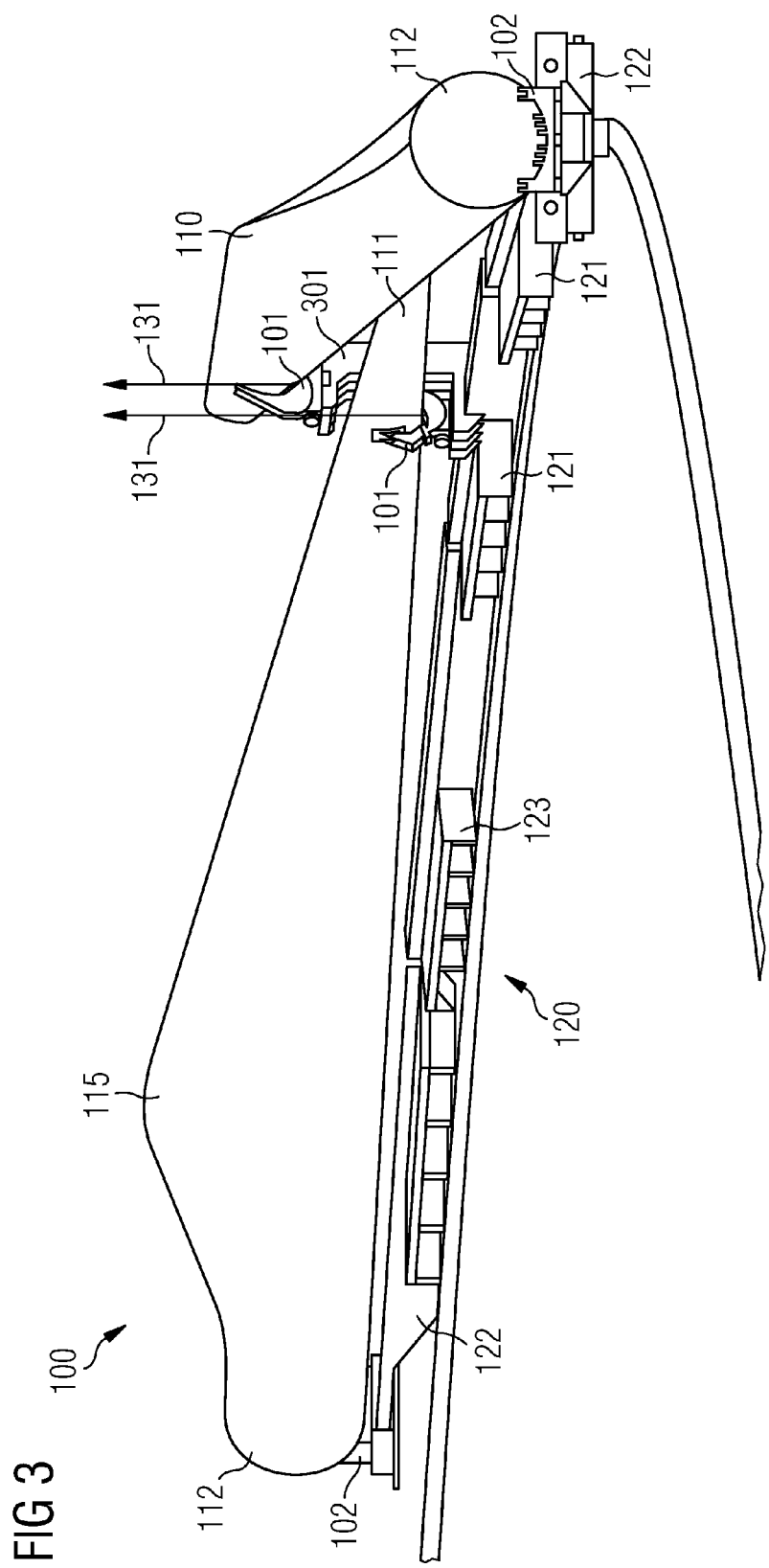

SYSTEM FOR TRANSPORTATION OF BLADES ON RAILCARS

CROSS REFERENCE TO RELATED APPLICATIONS

This application is the US National Stage of International Application No. PCT/EP2008/068216 filed Dec. 23, 2008, and claims the benefit thereof. The International Application claims the benefits of U.S. Provisional Application No. 61/089,621 US filed Aug. 18, 2008. All of the applications are incorporated by reference herein in their entirety.

FIELD OF INVENTION

The present invention relates to a fixation system for fixing rotor blades of a wind turbine to a vehicle. Moreover, the present invention relates to a method of fixing rotor blades of the wind turbine to a vehicle.

ART BACKGROUND

The world's energy consumption is covered more and more with regenerative energy sources such as wind energy. Therefore, the parts of wind turbines have to be transported from the place of manufacture to operating regions with an adequate wind force for producing effectively energy from wind power.

In order to increase the efficiency of the wind turbines, the rotor blades are designed large and larger in order to provide a large area exposed to the wind. Due to these large sized rotor blades of the wind turbines the transportation of such rotor blades may be complicated with conventional transportation means.

US 2007/0189895 A1 discloses a method and a system for transporting wind turbine components. The mounting system includes a plurality of adjacent railcars including a first railcar that includes spaced first and second wheel assemblies, each including at least one wheel pair. The mounting system furthermore includes a first frame and a second frame coupled to the first railcar. The first frame and the second frame are spaced to partially supporting the load.

SUMMARY OF THE INVENTION

There may be an object for providing a proper transportation of wind turbine elements.

This need may be met by the subject matter according to the independent claims. In particular, this object may be solved by a fixing system for fixing wind turbine elements of a wind turbine to a vehicle and by a method of fixing wind turbine elements of a wind turbine to a vehicle. Advantageous embodiments of the present invention are described in the dependent claims.

According to a first exemplary embodiment of the invention, a fixation system for fixing wind turbine elements of a wind turbine to a vehicle is provided. The fixation system comprises a first fixation device for fixing a first portion of a wind turbine element pivotably around a first axis of the first fixation device and around a second axis of the first fixation device to the vehicle. The fixation system further comprises a second fixation device for fixing a second portion of the wind turbine element pivotably around a first axis of the second fixation device and around a second axis of the second fixation device. One of the first fixation device and of the second fixation device is adapted for providing a translation movement of the wind turbine element with respect to the vehicle along a third axis. The first axes, the second axes and the third axis are different.

According to a further exemplary embodiment of the invention, a method of fixing wind turbine elements of a wind turbine to a vehicle. According to the method, a first portion of a wind turbine element is fixed pivotably around a first axis of a first fixation device and around a second axis of the first fixation device to the vehicle by the first fixation device. Furthermore, a second portion of the wind turbine element is fixed pivotably around a first axis of a second fixation device and around a second axis of the second fixation device to the vehicle by the second fixation device. A translation movement of the wind turbine element along a third axis by at least one of the first fixation device and of the second fixation device is provided. The first axes, the second axes and the third axis are different.

The wind turbine elements may denote a part or a component of a wind turbine that have to be transported to the place of installation of the wind turbine. The wind turbine element may comprise for instance a rotor blade, a rotor shaft or a tower of a wind turbine.

The term "vehicle" may denote e.g. a truck vehicle or a rail vehicle which is adapted for transporting the wind turbine elements.

A fixation device may denote a device that is adapted for fixing the wind turbine element to the vehicle. The fixation device may fix the wind turbine element in such a way that the wind turbine element may be pivotably around two different axes, in particular around the first axis and the second axis.

The first axis may be for instance a vertical axis or in particular a vertical axis that is a perpendicular to a ground surface. In other words, the first axis may extend perpendicular to the direction with respect to a plane of the vehicle on the ground.

The second axis may be defined as an axis that is perpendicular to the first axis. The second axis may be a lateral axis with respect to the transport or movement direction of the vehicle. The second axis may be further defined as an axis perpendicular to the third axis.

The third axis may be an axis extending longitudinal direction of the vehicle. The longitudinal direction (third axis) may extend in the direction of the movement direction of the vehicle. Moreover, the third axis may be parallel with an extended direction of the wind turbine element. The extending direction of the wind turbine element may be a direction from a root end of the wind turbine element to a tip end of the wind turbine element.

The first axis, the second axis and the third axis may be different, i.e. the direction of the first axis, the second axis and the third axis may be different with respect to each other. The first axis, the second axis and the third axis may comprise a common intersection point wherein the angles between the first axis, the second axis and the third axis may be unequal to 0° and 180°. In particular, the first axis, the second axis and the third axis may be perpendicular to each other and may form a Cartesian system wherein each axis may define a direction in space. Thus, the first axis may be in particular a vertical axis, the second axis may be a lateral axis and the third axis may be a longitudinal axis with respect to the vehicle and/or the wind turbine element, for instance.

The first axis, the second axis and the third axis of the first fixation device and the first axis, the second axis and the third axis of the second fixation device may be parallel but may also provide different extending directions and may thus be non-parallel to each other.

When wind turbine elements e.g. for train transportation, are much longer than e.g. 30 metres, an overhang issue arises. For instance, when transporting the wind turbine element by a rail vehicle, the longest available railcar may be a flat car used for holding truck cargos. Thus, the longest available railcar may be for instance approximately 27 m length which results in an overhang of a 45 m long blade of at least 18 m which may be unacceptable due to swingout in curves.

In conventional systems, the overhang problem may be solved by fastening blades of a wind turbine by two frames to one and the same railcar, wherein parts of the blades are hanging over further coupled railcars when the blades are longer than the railcar. Thus, this solution requires a tough and a very stiff and not very flexible fixture, because a movement of the blade with respect to the frames or with respect to the vehicle are not intended. Furthermore, by fixing long rotor blades stiff to a rail vehicle, an overhang over the other adjacent railcars occur and reduces the room for transportation of the adjacent railcars and thus of the whole vehicle because the adjacent railcars have to be kept empty to adapt the overhanging of the wind turbine element, for instance. Furthermore, when vehicle is driving a cornering motion, the blades may swing out with its overhang region. Thus, the swing out of the overhang region may lead to a restriction of the blade size, because on regular railroads lines blades with large swinging out overhang regions may not be transportable, for instance.

With the present invention, a fixation system for fixing the wind turbine elements is provided, wherein the wind turbine element is fixed by the first fixation device and the second fixation device. Each of the first fixation device and the second fixation device provide a pivotable fixation of the wind turbine element at least around two axes, namely the first axis and the second axis. Thus, when the relative position of the first fixation device and the second fixation device is changed due to e.g. a cornering motion of the vehicle, the wind turbine element may be transported without any twisting or any waste of an overhang space. Furthermore, when the distance between the first fixation device and the second fixation device changes due to a cornering movement of the vehicle, at least one of the first fixation device and the second fixation device provides a translation movement of the wind turbine element with respect to the vehicle so that stress of the stiff wind turbine element may be reduced. In other words, the relative position of the wind turbine element with respect to the vehicle may be changed (by rotation or translatory movement) during movement of the vehicle.

According to a further exemplary embodiment, the vehicle comprises a first attachment vehicle and a second attachment vehicle. The first attachment vehicle and the second attachment vehicle provide a relative movement between each other. The first fixation device is mountable to the first attachment vehicle wherein the second fixation device is mountable to the second attachment vehicle.

Under the term "attachment vehicle" a railcar or a truck trail may be denoted. Thus, when the vehicle comprises a first attachment vehicle and a second attachment vehicle that provides a relative movement between each other, the relative position between the first attachment vehicle and the second attachment vehicle is changeable due to a cornering motion or due to a change of the inclination of the two attachment vehicles of the vehicle when climbing a mountain, for instance. Thus, the wind turbine element may be pivotably attached to the first fixation device and the second fixation device, so that an adjustment rotation around the first axis and the second axis may be provided and twisting due to a fixed and bridged fixation of the blades may be prevented. Thus, with the present embodiment, the wind turbine element may be transported and fixed over at least two attachment vehicles without restricting the relative motion of the attachment vehicles with respect to each other. The fixation is therewith not restricted to a fixation to one rigid vehicle, such as one rigid railcar, but may be fixed to a plurality of attachment vehicles, so that even long wind turbine elements, such as rotor blades, may be transported without generating an unfavourable overhang.

Furthermore, if the standardized size of an attachment vehicle is too small, there is no need to produce a specific customized attachment vehicle with a comfortable size for transporting the rotor blade. By the present invention, in order to provide a sufficient length of the attachment vehicles, a plurality of attachment vehicles may be connected to a chain of attachment vehicles in order to provide the required size. Thus, standardized attachment vehicles may be used, also when the standard size of one standard attachment vehicles may be too small. Therefore, production costs of specified attachment vehicles may be prevented. Moreover, the fixation system is very flexible and very easy to adapt to larger or smaller turbine elements that have to be transported.

According to a further exemplary embodiment, the vehicle comprises a further attachment vehicle arranged between the first attachment vehicle and the second attachment vehicle. Thus, the distance between the first attachment device and the second attachment device may be enlarged, so that larger wind turbine elements may be transported. The further attachment vehicle may consist of a standardized attachment vehicle, such as a conventional standard railcars or standard truck trailer, so that no custom product has to be designed for transporting very long wind turbine elements. Even when a fixation system over the three attachment vehicles would be too small, a plurality of further attachment vehicles may be interposed between the first attachment vehicle and the second attachment vehicle. Thus, the transportation system is very flexible and may be adapted to each size of wind turbine elements.

Thus, the fixation system is in particular advantageous for transporting long wind turbine blades on railcars or truck trailers.

According to a further exemplary embodiment, the fixation system further comprises a mounting frame. The mounting frame is attachable to the vehicle. The mounting frame is adapted for mounting the first fixation device and the further first fixation device and/or the second fixation device and a further second fixation device to the vehicle. A further first fixation device may comprise equal characteristics as the first fixation device. The further second fixation device may comprise the equal characteristics than the second fixation device. Furthermore, the mounting frame may also mount a first fixation device and a second fixation device at the same time. The mounting frame may provide a J-shape wherein the fixation device and the further fixation device may be attached on top of each other or side by side to each other. If the mounting frame is attached to an attachment vehicle (rail car or a truck trailer) that is interposed between the first attachment vehicle and the second attachment vehicle (railcar, truck trailer), one wind turbine element may extend from the attachment vehicle to the first attachment vehicle in one direction and the other wind turbine element may extend to the opposite direction to the second attachment vehicle. Thus, by using three attachment vehicles, a plurality, e.g. two, wind turbine elements may be transported.

According to a further exemplary embodiment, the first portion of the wind turbine element is a section of a tip end of a rotor blade. The mounting frame is adapted for mounting the first fixation device fixing the section of the tip end. The mounting frame is further adapted for mounting a further first fixation device fixing a further section of the further tip end of a further rotor blade. Thus, the fixation system is adapted for transporting at least two rotor blades of a wind turbine, wherein the rotor blades may be fixed over three attachment vehicles. Thus, an efficient fixation system may be provided.

According to a further exemplary embodiment the first fixation device and the further first fixation device are mounted to the mounting frame vertical and/or horizontal spaced apart.

According to a further exemplary embodiment, the first fixation device and the further first fixation device are mounted on top of each other to the mounting frame. On top of each other may denote an arrangement of the first fixation device and the further first fixation device at the mounting frame along a substantially vertical direction along the first axis. Thus, the wind turbine element and the further wind turbine element may share a common region on the vehicle. In other words, the wind turbine elements may not be placed in a row one after another but may share the common region, so that the first or second portions of the wind turbine elements may overlap with each other in the common region of the vehicle. The overall distance between the first and the second fixation device and the further first and the further second fixation device may be reduced due to the possibility of overlapping the first portions or the second portions of the wind turbine elements. I.e., due to the overlapping of the first portions or the second portions of the wind turbine elements and due to the position of the first fixation device and the further first fixation device at the mounting frame along a substantially vertical direction along the first axis, a collision of the fixed first portions and second portions may be avoided if the wind turbine elements rotate at least around the first (vertical) axis. Thus, the vehicle may conduct a cornering motion without a collision of the first portions and second portions while providing a reduced overall length of the transportation system.

According to a further exemplary embodiment, the mounting frame comprises one or more guide rails extending along the third axis. At least one of the first fixation device and the second fixation device comprises a guide element. At least one of the respective first fixation device and the respective second fixation device is mounted to the mounting frame in such a way, that the guide element is engaged in the one or more guide rails, so that a guided motion of the at least one of the first fixation device and second fixation device along the third axis is provided. The guide rails may comprise for instance a guiding groove or a guiding rim or edge. The guide element may for instance be a guiding pin engagable into the guiding groove or a recess that may engage the guiding rim. Thus, a translatory motion along the third axis may be provided by the mounting frame.

According to a further exemplary embodiment, at least one of the first fixation device and of the second fixation device comprises a wheel device. The wheel device may be adapted for moving at least the first fixation device and/or the respective second fixation device along the third axis. Furthermore, the wheel device may be adapted for rotating the respective first fixation device and/or the respective second fixation device around the second axis. The wheel device may comprise rubber or steel wheels that may roll along a plane extended along the third axis. The wheel device may therefore be adapted to roll along a cargo area of the vehicle, for instance. With the wheel device further equipments for providing a translatory movement along the third axis may be needless. Furthermore, around the wheel axis the respective first fixation device or the respective second fixation device may be pivotable around e.g. the second axis. In other words, the first fixation device or the second fixation device may be tiltable around the wheel axis of the wheel device around the second axis. Instead of the wheel axis, a further pivot axis may be attached to the wheel device spaced from the wheel axis, wherein the first fixation device or the second fixation device may be tiltable around the further pivot axis.

According to a further exemplary embodiment, the at least one of the first fixation device and the second fixation device comprises a mounting plate and a bracket. The bracket is fixed to the wind turbine element. The mounting plate comprises one or more curve-shaped guide rails and the bracket comprises one or more engaging elements engaged in the curved shaped guide rails. Each curved shaped guide rail is formed in such a way, that when rotating the bracket around the first axis (e.g. vertical axis) the engaging element follows the curved shape of each curved shaped guide rail. The bracket may be rigidly fixed with the wind turbine element and therefore be an adapter for connecting the wind turbine element to the mounting plate. The bracket may be formed as a tip bracket for fixing a tip end of a blade or may be formed as a root bracket for fixing a root end of a blade. The mounting plate may be a plate with connection means to the bracket. In order to provide a defined rotation around the first axis, e.g. the vertical axis, the mounting plate comprises curved shaped guide rails, for instance guide grooves, to which the engaging element, such as a pin, may be engaged. Thus, the curved shaped guide rail predetermines the rotational movement of the first or second fixation device around e.g. the first axis.

According to a further exemplary embodiment, at least one of the first fixation device and the second fixation device comprises a pin extending along the second axis. The pin may be adapted for being engaged by the groove of the bracket, so that the at least one of the first fixation device and the second fixation device is pivotable around the second axis. Thus, the bracket may be used as adapter for engaging an engaging element for providing a pivotable movement around the first axis and for engaging the pin of the fixation devices in order to provide a pivotable movement around the second axis.

According to a further exemplary embodiment, the first fixation device and the second fixation device comprises a sliding shoe. The sliding shoes are detachable attached underneath the bracket for providing a slidable contact to the mounting plate or the mounting frame. Thus, abrasion between the fixation devices and the vehicle or abrasion between the fixation devices and the wind turbine element may be prevented or reduced. Furthermore, the sliding shoe may consist of a material that is softer and smoother than the material of the fixation devices, the vehicle or the wind turbine elements, so that the abrasion occurs to the sliding shoe. Furthermore, the sliding shoe may be exchangeable.

According to a further exemplary embodiment, at least one of the first fixation device and the second fixation device is adapted for fixing a transportation holder that is mounted to the wind turbine element. Thus, the transportation holder may be customized to the specific size and shape of the wind turbine element and may be standardized for the connection to the first fixation device and the second fixation device. Thus, the transportation holder may be used for a plurality of different shaped wind turbine elements, for instance. Furthermore, when changing the kind of vehicle, the transportation holder may be fixed with fixing means to the fixation devices without releasing the wind turbine element with respect to the transportation holder. Thus, a further realignment of the wind turbine element with respect to the fixation device may be prevented and the risk of damage of the wind turbine element may be reduced. The transportation holder may comprise standardized connection means to the fixation devices, so that a fast exchange of the transportation holder respectively of the vehicles may be provided.

According to a further exemplary embodiment, the vehicle is selected from one of the group consisting of rail vehicles and road vehicles.

When wind turbine elements, such as wind turbine blades or other cargo for train or truck transportation much longer than e.g. 30 meters, an overhang issue arises. The longest available rail car is a flat car used for hauling truck trailers. It's approximately 27 meters length which may result in an overhang of a 45 m long element (e.g. wind turbine blade) of at least 18 meters which may be unacceptable due to swing-out in curves.

According to the present invention a system for transportation of long wind turbine elements (blades) on railcars or truck trailers is provided. When transporting more than one wind turbine elements (blades) the system may consist of at least three railcars (preferable five railcars), one railcar (first attachment vehicle) where a first wind turbine element (blade) is fastened at the root end by a rotatable fixture (first fixation device) and a second railcar (second attachment vehicle) where a second blade (second fixation device) is also fastened at the root end by a further rotatable fixture (second fixation device) and a third railcar (attachment vehicle) placed between the first and the second railcar where this third railcar comprises the mounting frame comprising the first and/or second fixation devices for each blade section (e.g. blade tip end) and this fixation devices are both rotatable and longitudinal movable along the wind turbine element (blade). The fixture for the blade root end (e.g. second fixation device) could instead be rotatable and longitudinal movable while the fixture for the blade tip end (e.g. first fixation device) then is only rotatable. The mentioned fixtures (fixation devices) may be all rotatable in the plane along the blades and/or the railcars. When transporting only one blade only two or more attachment vehicles (railcars) are necessary. The above mentioned (attachment vehicles) railcars are connected by joints which permits rotation and small longitudinal movements along and between the attachment vehicles (railcars).

In other words the invention provides a transportation of long wind turbine elements (blades) on at least two railcars where there is a first fixation device for the blade root end (first portion) on the first railcar and a second fixation device for the blade tip end (second portion) on the second railcar and where both fixation devices are rotatable in the plane along the blades and the railcars and where either the first fixing device or the second fixing device is longitudinal movable. The system is provided very flexible and is very easy to adapt to larger or smaller elements (blades).

It is preferable that the system may consist of five attachment vehicles (railcars) for transporting two wind turbine elements (blades). When five attachment vehicles (railcars) are used each railcar may be quite smaller than when three railcars are used and using the small railcars may make the system less expensive.

The first or second fixing devices for the first portion or the second portion (tip end or blade root) may comprise a fixture with an axle stub and two curved guiding rails or tracks connected to a bracket using locks or connections like twist locks. The first or second fixing devices are mounted to the railcar and a transportation holder, mounted to the blade portion, is fixed to a bracket of the first or second fixing devices. An axle stub or pin may facilitate rotation about the vertical axis (e.g. first axis) and rotation about the lateral axis, while restricting displacement in the transversal direction. The curved tracks for the connections like twist locks also facilitate rotation about the vertical axis while restricting a vertical movement. The first or second fixing devices may comprise sliding shoes enveloping the connections to the vehicle. The sliding shoes can be provided with lubrication nipples to reduce wear and tear. The sliding shoes may make it possible to provide the twist locks with a larger friction area to reduce the wear down of the interface.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows a schematic view of an exemplary embodiment of the fixation system according to the present invention;

FIG. 2 illustrates a top view of the exemplary embodiment shown in FIG. 1;

FIG. 3 shows a side view of an exemplary embodiment of the fixation system during a cornering motion of the vehicle;

DETAILED DESCRIPTION

Figure 4:
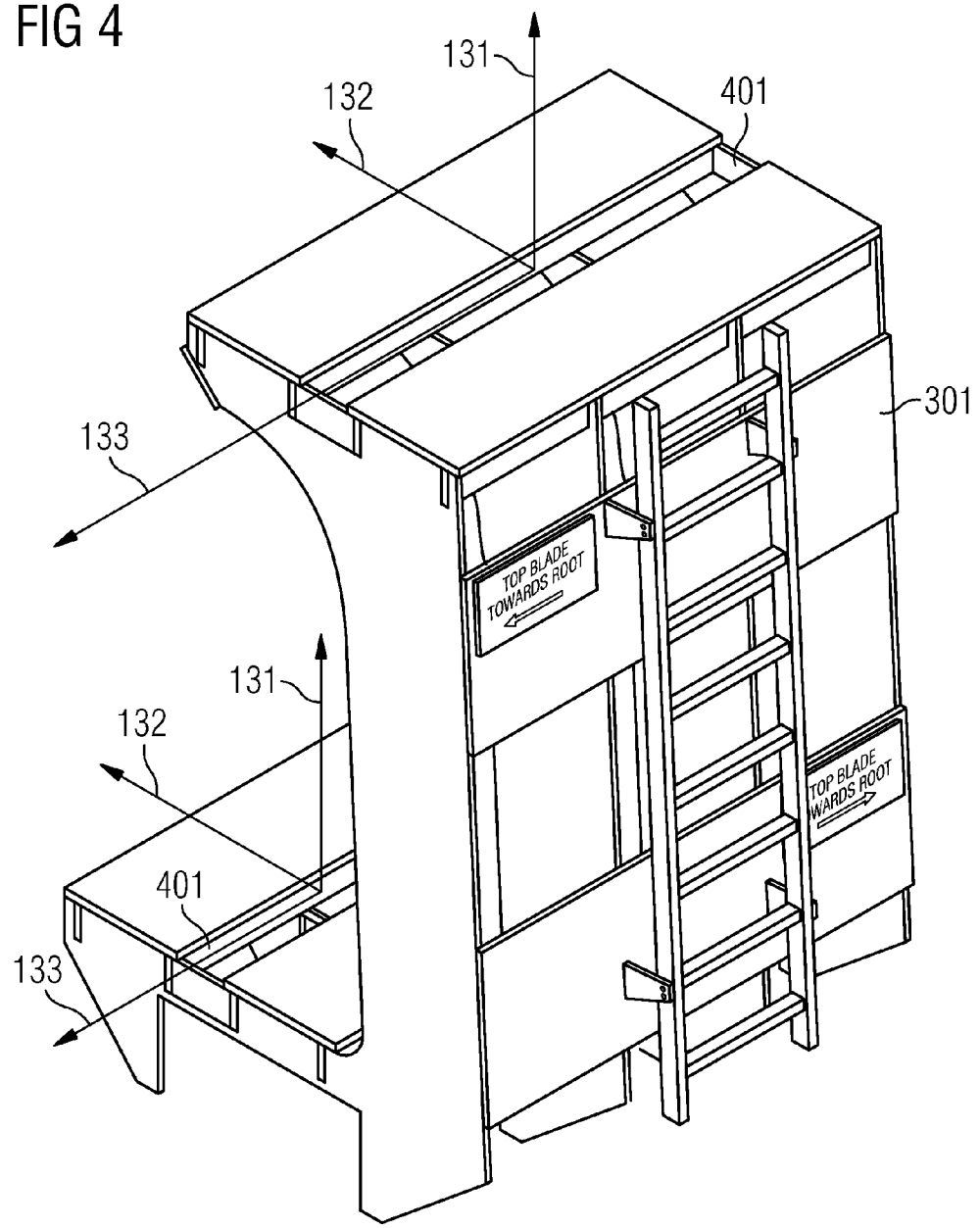
FIG. 4 illustrates an exemplary embodiment of a mounting frame.

The illustrations in the drawings are schematically. It is noted that in different figures, similar or identical elements are provided with the same reference signs or with reference signs, which are different from the corresponding reference signs only within the first digit.

FIG. 1 shows a fixation system 100 for fixing wind turbine elements 110, 115 of the wind turbine to a vehicle 120. The fixation system 100 comprises a first fixation device 101 for fixing a first portion 111 of a wind turbine element 110 pivotably around a first axis 131 of the first fixation device 101 and around the second axis 132 of the first fixation device 101 to the vehicle 120. Furthermore, the fixation system 100 comprises a second fixation device 102 for fixing a second portion 112 of the wind turbine element 110 pivotably around a first axis 131 of the second fixation device 102 and around a second axis 132 of the second fixation device 102 to the vehicle 120. One of the first fixation device 101 and of the second fixation device 102 is adapted for providing a translation movement of the wind turbine element 110 with respect to the vehicle 120 along a third axis 133. The first axes 131, the second axes 132 and the third axis 133 are different.

The vehicle 120 illustrated in FIG. 1 comprises furthermore a first attachment vehicle 121 to which the first fixation devices 101 are attached and a second attachment vehicle 122 to which the second fixation devices 102 are attached and further attachment vehicles 123 that are interposed between the first attachment vehicles 121 and the second attachment vehicles 122. The attachment vehicles 121, 122, 123 are attached together in such a way, that a relative movement may be provided, so that e.g. a cornering motion of the vehicle or ascending motion of the vehicle 120 may be possible.

Furthermore, FIG. 1 illustrates a wind turbine element 110 and a further wind turbine element 115 that are both attached to the vehicle 120. In the present exemplary embodiment, the vehicle 120 may comprise a rail vehicle and the attachment vehicles 121, 122, 123 may comprise railcars. The wind turbine elements 110, 115 may consist of rotor blades that comprise a first portion 111 in the region of the tip end and a second portion 112 in the region of the root end of the rotor blades 110, 115.

As shown in FIG. 1, the railcars 121, 122, 123 may comprise a standardized length, wherein the wind turbine elements (rotor blades) 110, 115 may be longer than one standardized railcar 121, 122, 123. Because the first fixation devices 101 and the second fixation devices 102 are pivotable around the first axis 131 and around the second axis 132 the alignment and the position between the fixation devices 101, 102 may be changeable (during a movement of the vehicle 120) without damaging the rotor blades 110, 115 (wind turbine elements). Furthermore, in particular when a cornering motion occurs, at least one of the first fixation devices 101 and/or the second fixation devices 102 is adapted for providing a translation movement of the rotor blades 110, 115 along the third axis 133 which may be in the exemplary embodiment be the longitudinal axis.

FIG. 2 illustrates an exemplary embodiment of the fixation system, wherein the vehicle 120 is shown in a cornering motion. The wind turbine elements 110, 115 are fixed by the first fixation device 101 and by the second fixation device 102 pivotably around the first axis 131 and around the second axis 132. Furthermore, when driving a cornering motion, a distance between the first fixation device 101 and the second fixation device 102 is shortened, so that at least the first fixation device 101 or the second fixation device 102 provides a translatory (translation) movement of the wind turbine element 110, 115 along the third axis.

The first axis 131, the second axis 132 and the third axis 133 of the first fixation device 101 may be parallel to the first axis 131, the second axis 132 and the third axis 133 of the second fixation device 102 in case of a straight ahead driving (forward driving).

In case of a cornering movement of the vehicle 120, a first axis 131 (e.g. the vertical axis) of the first fixation device 101 may be still parallel to the first axis 131 of the second fixation device 102. In case of the cornering movement, the second axis 132 (e.g. the lateral axis with respect to the attachment vehicle 121, 122) and the third axis 133 (e.g. longitudinal direction with respect to the attachment vehicle 121, 122) may be non, parallel. When driving over a hill with an inconstant inclination, the second axis 132 of the first fixation device 101 and the second axis 132 of the second fixation device 102 and the third axis 133 of the first fixation device 101 and the second fixation device 102 may be parallel, wherein the first axis 131 of the first fixation device 101 and the first axis 131 of the second fixation device 102 may be non-parallel.

As can be seen from FIG. 2, the overhang of the tip end, i.e. the first portion 111, may be reduced. If the turbine elements 110, 115 would be connected to only one attachment vehicle a hangover would be large during a cornering motion. In particular, the overhang of the first portion 111 or second portion 112 would be large with respect to a rail track or of a curvature of the rail track.

FIG. 3 illustrates a side view of the fixation system 100. A first rotor blade 110 is connected with a second portion 112 (root end) to the second attachment device 102 which is attached to a second attachment vehicle 122 (second railcar). The further wind turbine element 115 (further rotor blade) may be connected with its second portion 112 to a further second fixation device 102 to a further second attachment vehicle 122. The first portions 111 of the rotor blade 110 and the further rotor blade 115 (tip ends 111 of the rotor blades 110, 115) are attached to respective first fixation devices 101 that are attached to a first attachment vehicle 121 (first railcar). The first fixation device 101 and the further first fixation device 101 are both attached one upon the other to a mounting frame 301 that may comprise a J-shape. The mounting frame 301 may be rigid wherein the first fixation devices 101 may be pivotable individually around the first axis 131 (vertical axis) and around the second axis 132 (lateral axis) with respect to the further first fixation device 101. Because the distance of the second fixation devices 102 to the first fixation devices 101 is reduced during a cornering motion of the vehicle 120, a longitudinal displacement or movement of fixation devices 101, 102 to the vehicle 120 or a longitudinal translatory movement of the wind turbine elements 110, 115 along a longitudinal axis (third axis 133) is provided.

FIG. 4 illustrates an enlarged view of the mounting frame 301. The mounting frame 301 may comprise a J-shape. Furthermore, the mounting frame 301 may comprise a guide rail 401 which may guide the first fixation device 101 or the second fixation device 102 along the third axis 133 with a translatory movement. Lubrication nipples may be provided for ensuring lubrication between the guide rail 401 and the first fixation device 101 or the second fixation device 102 to reduce wear and tear.

Figure 5:
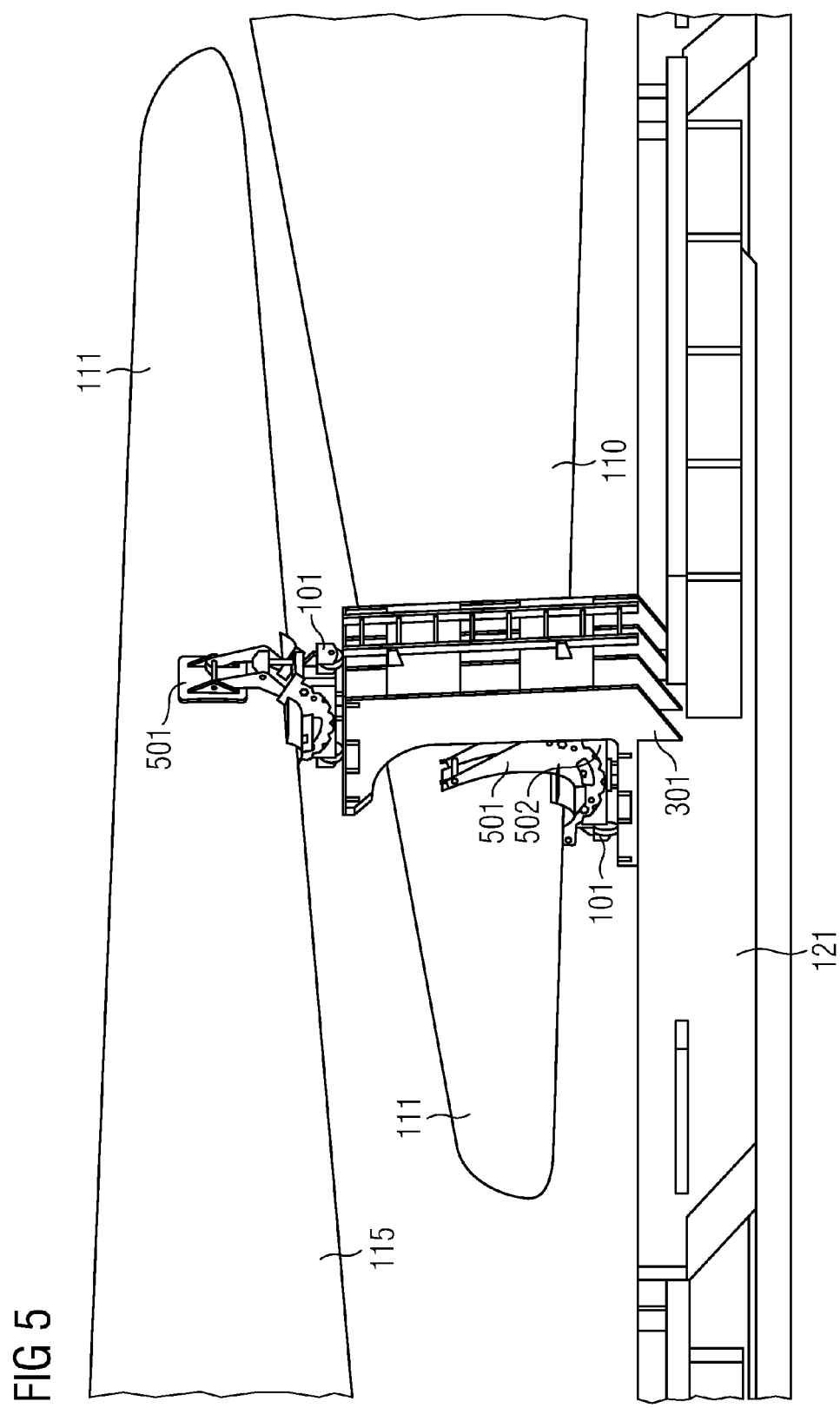
FIG. 5 illustrates an exemplary embodiment of the mounting frame attached to a vehicle.

Preferably, as shown, the J-shaped mounting frame 301 has an upper guide rail 401 and a lower guide rail 401, so it is possible to carry and restrain a first portion 111 of each of two wind turbine elements 110, 115, e.g. the blades, on the mounting frame 301 by using e.g. two fixation devices 101, as further illustrated e.g. in FIG. 5.

FIG. 5 illustrates a view of the mounting frame 301 comprising a first fixation device 101 and a further first fixation device 101. Each of the first fixation devices 101 fixes a wind turbine element 110 and/or a further wind turbine element 115. In particular, the wind turbine elements 110, 115 are rotor blades of a wind turbine. The first fixation device 101 fixes the wind turbine elements 110, 115 at a first portion 111 which may be a tip end section of the rotor blade. Moreover, the wind turbine elements 110, 115 may be attached to the first fixation devices 101 by means of a transportation holder 501. During the mounting of the blade to the respective vehicle 120, the transportation holder 501 may be kept to fix to the rotor blades 110, 115. Thus, even if the vehicle 120 is changed, the rotor blades 110, 115 may not be released from the transportation holder 501, so that the risk of damage may be reduced. The transportation holder 501 may be angle adjustable and may comprise a standardized fixing means for being fixed to the first fixation devices 101. The first fixation device 101 may comprise a tip bracket 502 to which the tip end (first portion 111) may be fixed directly or by the transportation holder.

Figure 6:
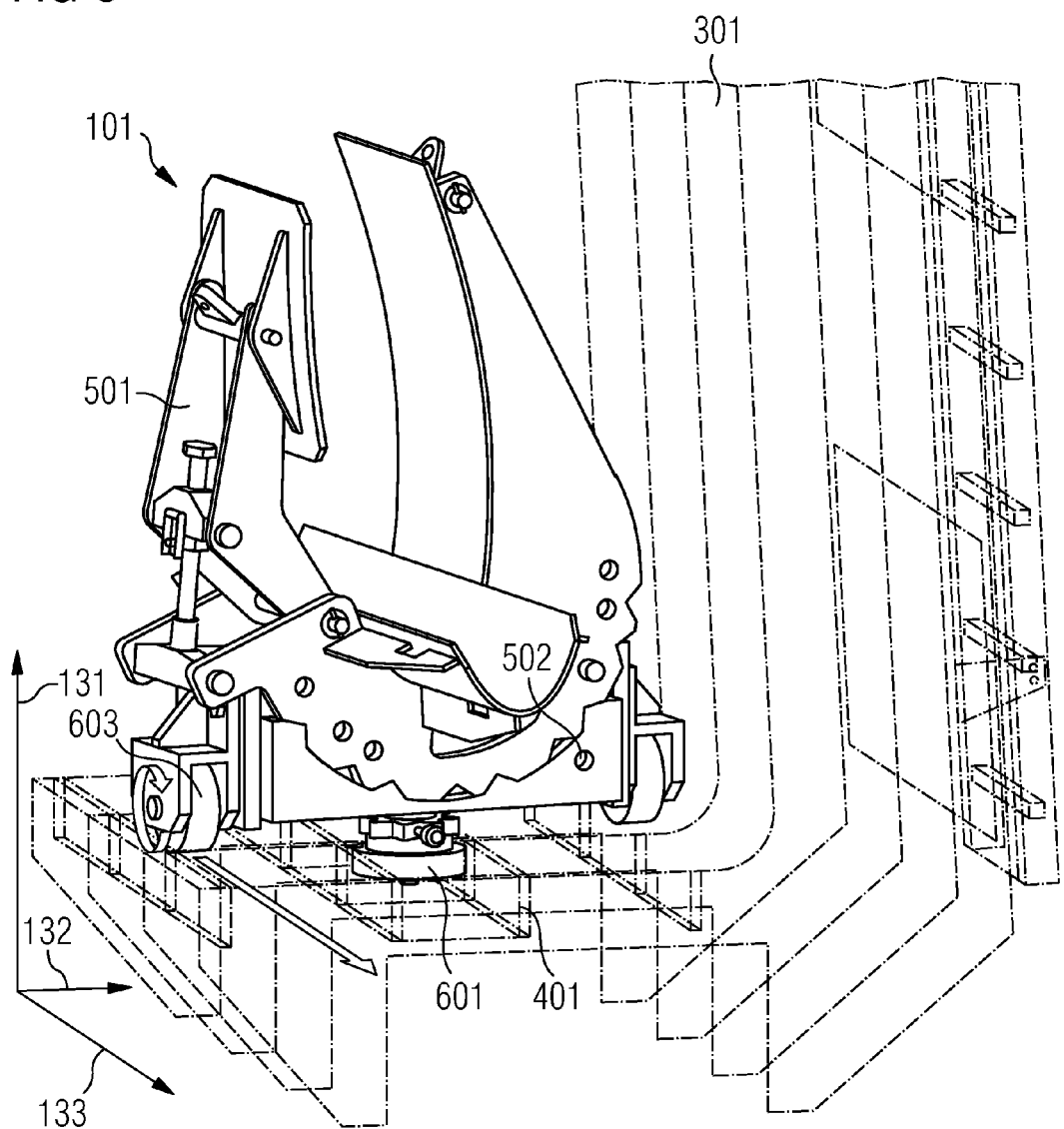
FIG. 6 illustrates an enlarged view of the mounting frame including a fixation device according to an exemplary embodiment of the invention.

FIG. 6 illustrates a front view of a first fixation device 101 mounted to the mounting frame 301. First fixation device 101 may comprise a guide element 601 that may be engaged by the guide rail 401 in the mounting frame 301. Thus, the first fixation device 201 may provide a translation movement along the third axis 133 that is guided by the guiding rail 401 which may be e.g. a guiding groove.

The first fixation device 101 may further comprise the tip bracket 502 to which the transportation holder 501 may be mounted or to which the wind turbine element 110, 115 may be mounted directly. Furthermore, the first fixation device 101 may comprise a wheel device 603. The wheel device 603 may be adapted for providing a translatory movement along the third axis 133. Furthermore, a rotation around its wheel axis around the second axis 132 may be provided. In other words, the first fixation device 101 may be tiltable around the wheel axis, i.e. the second axis 132. Furthermore, the wheel device 603 comprises two wheels that are arranged rollable to the mounting frame 301. If the first wheel moves in the first direction and the second wheel moves in the opposite direction, a rotation around the first axis 131 of the first fixation device 101 may also be provided. Instead of the wheel device 603 a sliding device may be attached to the first or second fixation device 101, 102, so that a sliding support along the third axis 133 may be provided.

Figure 7:
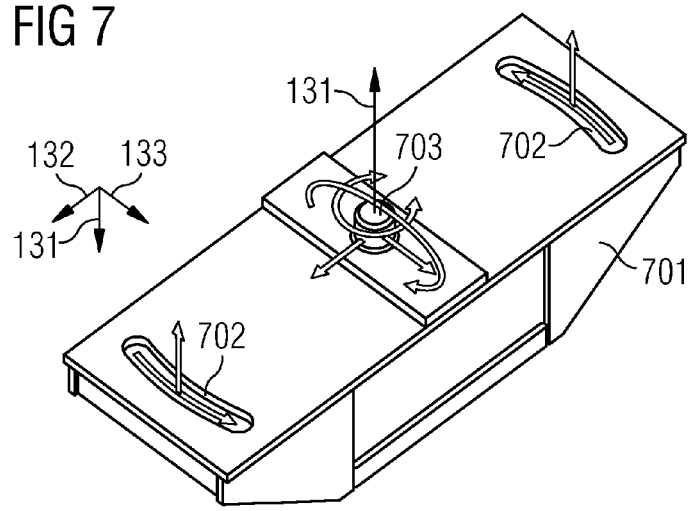
FIG. 7 illustrates an exemplary embodiment of a mounting plate.

FIG. 7 illustrates a mounting plate 701 of a first fixation device 101 or a second fixation device 102. The mounting plate 701 may comprise curved shaped guide rails 702 and a centre pin 703. The wind turbine element 110, 115 or in particular the transportation holder 501 may be mounted to the mounting plate 701 directly or by means of a root bracket 801 that is mounted to the mounting plate 701. The mounting plate 701 comprises a curved shaped guide rail 702. The guide rail 702 may predetermine a rotary movement around the first (vertical) axis 131. The centre pin may improve the fixation of the wind turbine element 110, 115.

Figure 8:
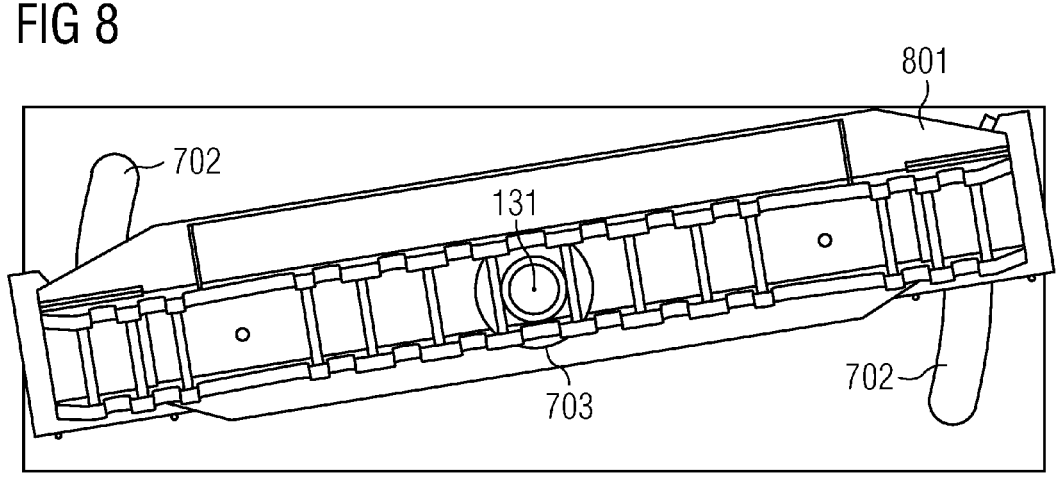
FIG. 8 illustrates a bracket mounted to the mounting plate according to an exemplary embodiment.

FIG. 8 illustrates the mounting plate 701, wherein to the mounting plate 701 a root bracket 801 is attached to. The root bracket 801 may fix the root end (e.g. second portion 112) of the blade. The root bracket 801 may comprise a guiding element that is engagable into the curved shaped guide rail 702 of the mounting plate 701. The rotation of the root bracket 801 around the first axis 131 is guided by the curved shaped guide rail 702.

Figure 9:
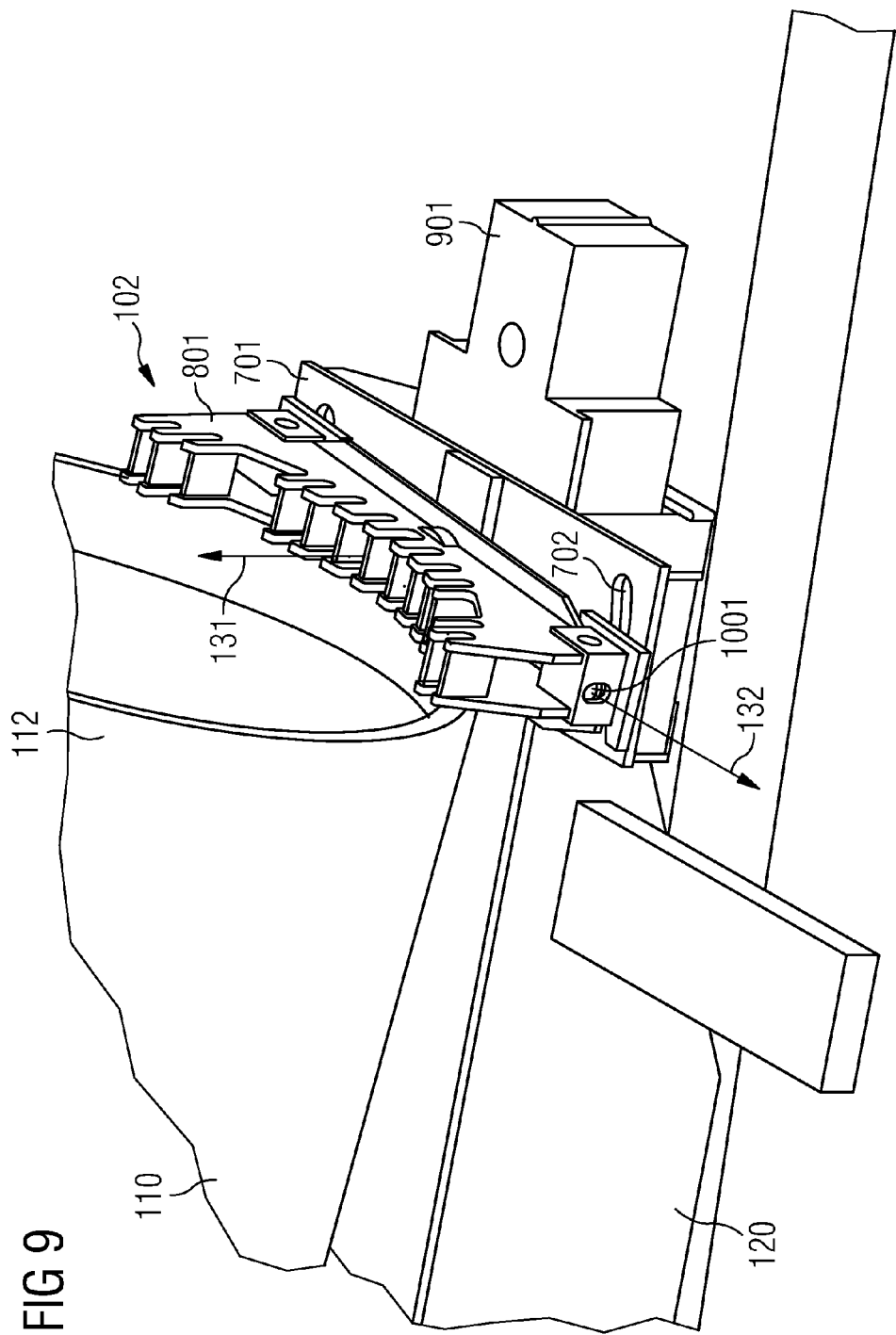
FIG. 9 illustrates an exemplary embodiment showing the mounting plate mounted to the vehicle.

FIG. 9 illustrates an enlarged view of the mounting plate 701 mounted to the vehicle 120. The mounting plate 701 is mounted either directly to the vehicle 120 or to an elongation element 901. The elongation element 901 may be attachable to the vehicle 120 in order to adjust the fixation location of the fixation devices 101, 102 with respect to the vehicle 120.

The wind turbine element 110 is attached to the root bracket 801, e.g. using bolts or other clamping means, wherein the root bracket 801 is rotatable around the first axis 131. Furthermore, the root bracket 801 may comprise a pin 1001 wherein around the pin 1001 a rotation around the second axis 132 may be provided. Preferably the top of the centre pin 703 of the mounting plate 701 is shaped like a sphere and it interfaces with an inner cylinder in the root bracket 801. In this way the root bracket 801 may be allowed to rotate about the second axis 132.

Figure 10:
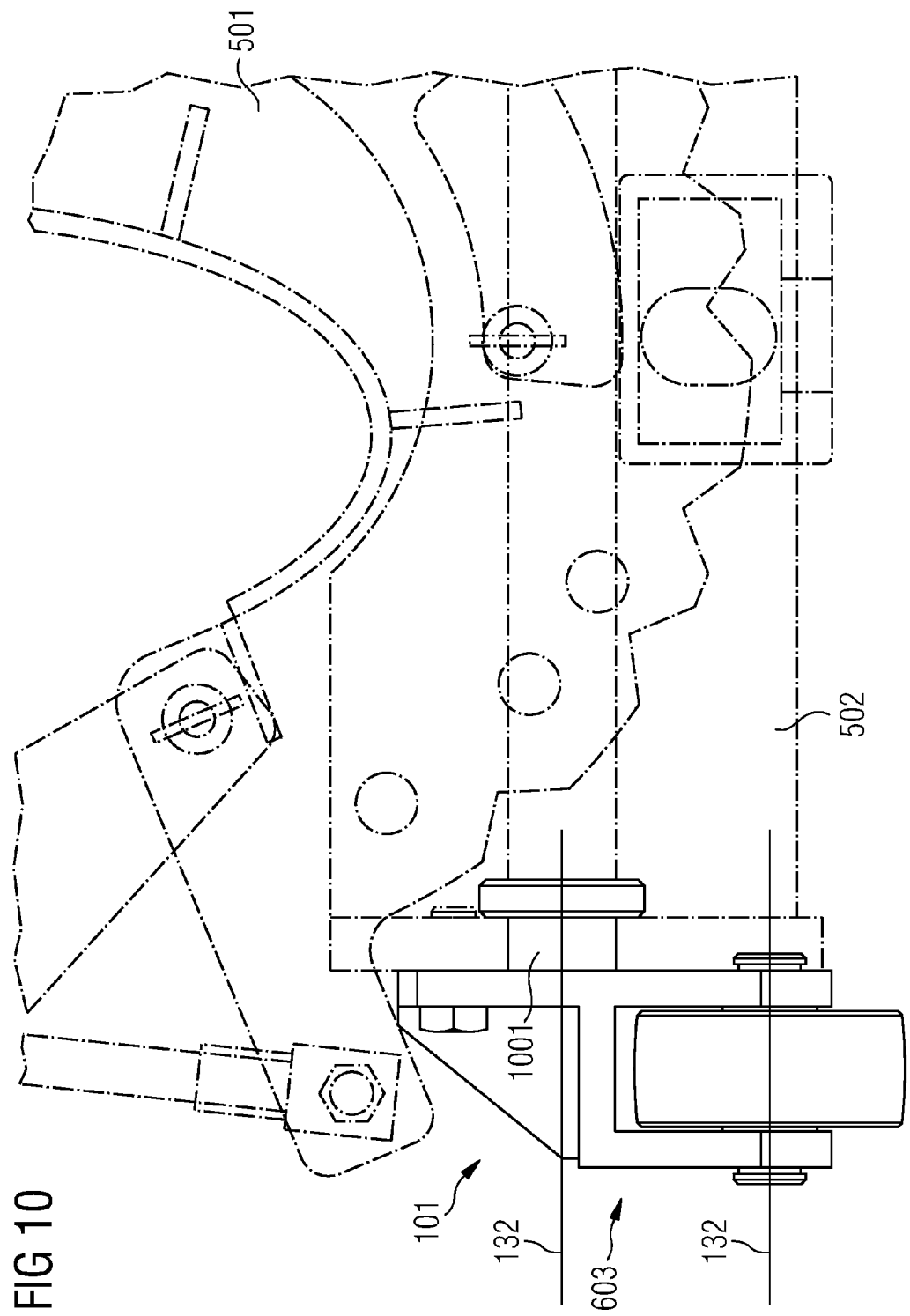
FIG. 10 illustrates a wheel device according to an exemplary embodiment.

FIG. 10 illustrates an enlarged view of an exemplary embodiment of the wheel device 603 to which the pin 1001 is attached to. The pin 1001 may comprise an extended direction along the second axis 132 around which the tip bracket 502 (or the root bracket 801) may be rotatable around the second axis. Furthermore, a rotary axis around the second axis 132 may be provided by the wheel device 603 respectively by the wheel axis.

Figure 11:
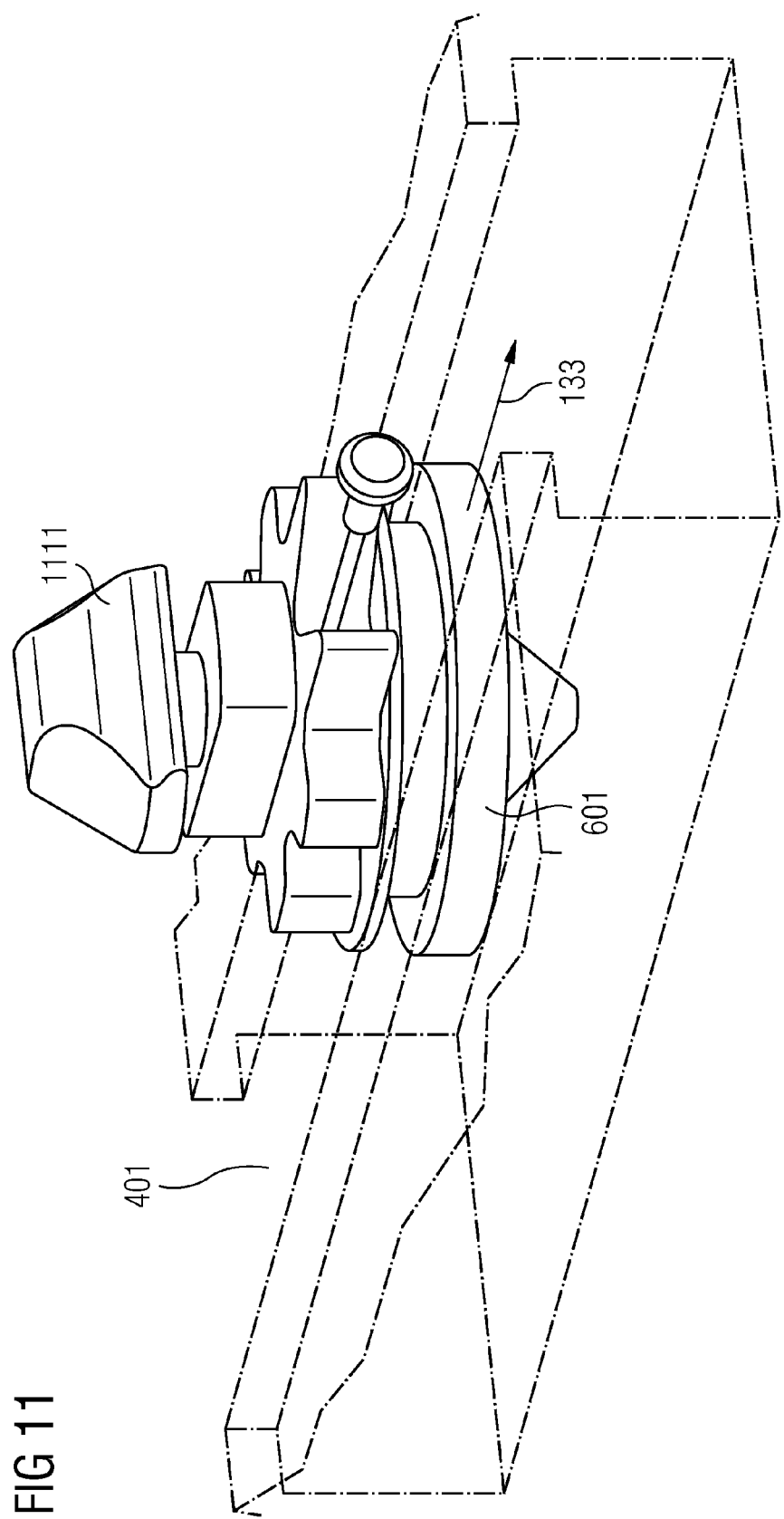
FIG. 11 illustrates a twist lock connection according to an exemplary embodiment.

FIG. 11 illustrates an enlarged view of the guide element 601 engaged into the guide rail for providing a guided longitudinal and translatory motion along the third axis 133. In the exemplary embodiment of FIG. 11, the guide element 601 may comprise a twist lock 1111 wherein an easy and standardized connection to a transportation holder 501 of the wind turbine element 110, 115 may be provided.

Figure 12:
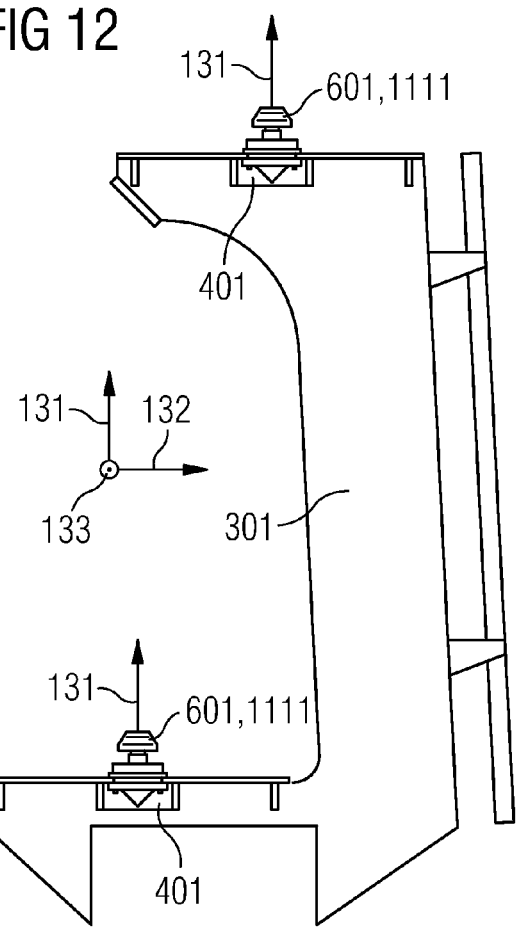
FIG. 12 illustrates a front view of the mounting frame comprising two fixation elements according to an exemplary embodiment.

FIG. 12 illustrates a front view of the mounting frame 301 comprising a J-shape. The mounting frame 301 comprises two guide rails 401 to which the guide element 601 and in particular the twist locks 1111 may be engaged. The first axis 131 of the upper guide element 601 and the lower guide 601 may be spaced in the direction of the second axis 132.

Figure 13:
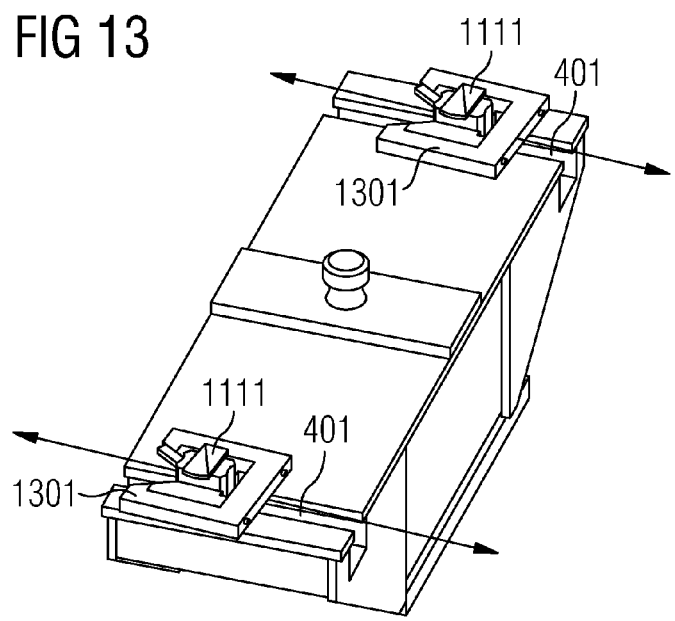
FIG. 13 illustrates sliding shoes connected to the bracket.

FIG. 13 illustrates one or more sliding shoes 1301 which may be detachable attached to one of the first fixation devices 101 and/or one of the second fixation devices 102 underneath the tip bracket 502 or the root bracket 801, e.g. using a twist lock 1111, where the sliding shoes 1301 slide upon a plate or frame like the mounting plate 701 or like the mounting frame 301. Thus, abrasion occurs only at the sliding shoe 1301 that may be attached exchangeable. The sliding shoes 1301 may also be slidingly connected to the curve shaped guiding rails 702.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A system for fixing a wind turbine element of a wind turbine to a vehicle, the system comprising:
   a first fixation device for fixing a first portion of the wind turbine element pivotably around a first axis of the first fixation device and around a second axis of the first fixation device to the vehicle; and
   a second fixation device for fixing a second portion of the wind turbine element pivotably around a first axis of the second fixation device and around a second axis of the second fixation device to the vehicle,
   wherein the first fixation device or the second fixation device is configured to provide a translation movement of the wind turbine element with respect to the vehicle along a third axis, and
   wherein the first axis, the second axis and the third axis are different.

2. The system as claimed in claim 1, wherein the vehicle comprises:
   a first attachment vehicle and a second attachment vehicle, wherein the first attachment vehicle and the second attachment vehicle provide a relative movement between each other,
wherein the first fixation device is mountable to the first attachment vehicle, and
wherein the second fixation device is mountable to the second attachment vehicle.

3. The system as claimed in claim 1, wherein the vehicle further comprises:
a further attachment vehicle arranged between the first attachment vehicle and the second attachment vehicle.

4. The system as claimed in claim 1, further comprising:
a mounting frame,
wherein the mounting frame is attachable to the vehicle, and
wherein the mounting frame is configured to mount
the first fixation device and a further first fixation device and/or
the second fixation device and a further second fixation device to the vehicle.

5. The system as claimed in claim 4,
wherein the first portion of the wind turbine element is a section of a tip end of a rotor blade,
wherein the mounting frame is adapted for mounting the first fixation device fixing the section of the tip end, and
wherein the mounting frame is adapted for mounting a further first fixation device fixing a further section of a further tip end of a further rotor blade.

6. The system as claimed in claim 4,
wherein the first fixation device and the further first fixation device are mounted to the mounting frame vertical and/or horizontal spaced apart.

7. The system as claimed in claim 5,
wherein the first fixation device and the further first fixation device are mounted on top of each other to the mounting frame.

8. The system as claimed in claim 6,
wherein the first fixation device and the further first fixation device are mounted on top of each other to the mounting frame.

9. The system as claimed in claim 4,
wherein the mounting frame comprises one or more guide rails extending along the third axis,
wherein at least one of the first fixation device and the second fixation device comprises a guide element, and
wherein at least one of the first fixation device and the second fixation device is mounted to the mounting frame such that the guide element is engaged in the one or more guide rails, so that a guided motion of the at least one of the first fixation device and second fixation device along the third axis is provided.

10. The system as claimed in claim 1,
wherein the first fixation device or the second fixation device comprises a wheel device, wherein the wheel device
moves the first fixation device or the second fixation device along the third axis, and
rotates the first fixation device or the second fixation device around the second axis.

11. The system as claimed in claim 1,
wherein the first fixation device or the second fixation device comprises a mounting plate and a bracket,
wherein the bracket is fixed to the wind turbine element,
wherein the mounting plate comprises one or more curved-shape guide rails,
wherein the bracket comprises one or more engaging elements engaged in the curved-shape guide rails, and
wherein each curved-shape guide rail is formed such that, when rotating the bracket around the first axis, the engaged engaging element follows the curved shape of each curved-shape guide rail.

12. The system as claimed in claim 11,
wherein the first fixation device or the second fixation device comprises a pin extending along the second axis, and
wherein the pin is adapted for being engaged by a groove of the bracket so that the first fixation device or the second fixation device is pivotable around the second axis.

13. The system as claimed in claim 11,
wherein the first fixation device or the second fixation device comprises one or more sliding shoes, and
wherein the sliding shoes are detachable attached underneath the bracket for providing a slidable contact to the mounting plate or the mounting frame.

14. The system as claimed in claim 12,
wherein the first fixation device or the second fixation device comprises one or more sliding shoes, and
wherein the sliding shoes are detachable attached underneath the bracket for providing a slidable contact to the mounting plate or the mounting frame.

15. The system as claimed in claim 1,
wherein the first fixation device or the second fixation device is adapted for fixing a transportation holder that is mounted to the wind turbine element.

16. The system as claimed in claim 1,
wherein the vehicle is selected from the group consisting of rail vehicles and road vehicles.

17. A method of fixing wind turbine elements of a wind turbine to a vehicle, the method comprising:
fixing a first portion of a wind turbine element pivotably around a first axis of a first fixation device and around a second axis of the first fixation device to the vehicle by the first fixation device,
fixing a second portion of the wind turbine element pivotably around a first axis of a second fixation device and around a second axis of the second fixation device to the vehicle by the second fixation device, and
providing a translation movement of the wind turbine element along a third axis by the first fixation device and/or the second fixation device,
wherein the first axis, the second axis and the third axis are different.

* * * * *